United States Patent [19]  [11]  4,305,108
Udren  [45]  Dec. 8, 1981

[54] THREE-PHASE TIME OVERCURRENT DETECTOR

[75] Inventor: Eric A. Udren, Monroeville, Pa.

[73] Assignee: Westinghouse Electric Corp., Pittsburgh, Pa.

[21] Appl. No.: 77,877

[22] Filed: Sep. 21, 1979

[51] Int. Cl.³ .......................................... H02H 3/093
[52] U.S. Cl. ........................................ 361/96; 361/94
[58] Field of Search ................ 361/96, 97, 94, 93, 361/63, 87, 31, 30, 95, 98; 328/144, 143, 156, 158, 159

[56] References Cited

U.S. PATENT DOCUMENTS

| Re. 25,762 | 4/1965 | Kotheimer . | |
| 3,262,017 | 7/1966 | Ashenden et al. | 361/94 |
| 3,290,556 | 12/1966 | Graham et al. . | |
| 3,312,867 | 4/1967 | Sonnemann . | |
| 3,419,757 | 12/1968 | Steen . | |
| 3,440,491 | 4/1969 | Tenenbaum et al. | 361/94 X |
| 3,546,531 | 12/1970 | Miner | 361/31 |
| 3,633,073 | 1/1972 | Day et al. . | |
| 3,666,994 | 5/1972 | Watson et al. . | |
| 3,777,215 | 12/1973 | D'Esopo . | |
| 4,000,446 | 12/1976 | Vandevier et al. | 361/96 |

Primary Examiner—Patrick R. Salce
Attorney, Agent, or Firm—E. L. Pencoske

[57] ABSTRACT

A polyphase time overcurrent detector provides a variably delayed control signal wherein the delay is inversely related to both the current magnitude and the number of faulted phases. Current transducers produce input signals representative of the current flowing in each phase of the polyphase system. The input signals are added together to produce a charging signal. If at the end of a predetermined time period the fault has not been cleared, the charging signal will begin to charge a capacitor. If the capacitor charges to a predetermined voltage level within a fixed time period, the control signal is initiated.

10 Claims, 2 Drawing Figures

4,305,108

THREE-PHASE TIME OVERCURRENT DETECTOR

BACKGROUND OF THE INVENTION

1. Field of the Invention

This invention relates to polyphase electrical power systems and more particularly to protective relaying apparatus initiating control signals in response to the occurrence of a fault condition on the system.

2. Description of the Prior Art

The actuation of a principal breaker in response to the sensing of a fault by a fault detector normally results in the opening of the principal breaker and the interruption of the fault current which was flowing therethrough. In exceptional circumstances the principal breaker fails to interrupt the fault current and backup breakers must be actuated to prevent loss of stability in, and excessive damage to, the power system. The result of actuating these backup breakers is that the faulted circuit, as well as unfaulted neighboring circuits, is deenergized. The actuation of the backup breakers should therefore be avoided whenever possible. However, if the principal breaker is actually unable to, or for any reason does not, interrupt the fault current the backup breakers must be actuated. When a current greater than a predetermined minimum magnitude flows through the principal breaker at a time interval beyond that established for the breaker to interrupt the fault current, the breaker is presumed to have failed and the backup breakers must be actuated to interrupt the fault current.

A substantial portion of the prior art uses either one of two schemes for producing a control signal for the actuation of the backup breakers. The first scheme initiates a control signal at the end of a fixed and predetermined time period measured from the occurrence of a fault condition. The time period is chosen such that protection is provided in the event of the worst possible expected conditions. This scheme provides for a minimal amount of time between the failure of the primary breaker and the actuation of the backup breakers thus assuring system stability at the expense of unnecessary tripping. The net result is the premature actuation of the backup breakers whenever there is a fault which does not seriously threaten system stabiltiy.

The second scheme provides a control signal at the end of a time period that is inversely proportional to the magnitude of the largest fault current. Accordingly, when there is a large fault current which threatens system stability the time between the failure of the principal breaker and the actuation of the backup breakers is significantly less than when there is a small fault current which does not threaten system stability. Such a scheme is illustrated in U.S. Pat. No. 3,666,994. The overcurrent protective device disclosed therein is responsive to the overcurrent of greatest magnitude in a polyphase electrical circuit.

Overcurrent protective devices which initiate control signals at the end of a time period that is inversely proportional to the magnitude of a fault current provide for the fast actuation of backup breakers for severe high current faults and at the same time provide for slower actuation in less critical situations. However, current magnitude in and of itself is not always a good indicator of the threat to system stability. A better indication is the number of faulted phases in addition to the magnitude of the fault currents. The invention disclosed herein is a current detector that is responsive to both current magnitude and the number of faulted phases.

SUMMARY OF THE INVENTION

This invention is for an improved three-phase time overcurrent detector responsive to both current magnitude and the number of faulted phases. On a typical three-phase system current transducers together with isolation transformers produce, for each of the three phases, an input signal representative of the current flowing in the phase. A fourth isolation transformer produces an input signal responsive to the residual or ground current. The four input signals are rectified. The rectified signals are scaled and input to an operational amplifier. The operational amplifier adds the four scaled signals to produce a resultant or charging signal. The charging signal is conducted to ground through the series combination of a resistor and a capacitor. A level detector continually compares the voltage level of the capacitor to a predetermined, reference voltage level, and initiates a variably delayed control signal if the capacitor charges to the level of the reference voltage. The capacitor is also shorted to ground by a transistor which, during normal operation, is conductive. The transistor is responsive to a timer. The timer is responsive to a breaker failure initiation (BFI) signal produced by automatic protective devices not forming a part of this invention.

When the timer receives the BFI signal it begins to time out a first, fixed and predetermined time period during which the transistor remains conductive. At the end of the first time period the timer times out a second, fixed and predetermined time period during which the transistor is nonconductive. At the end of the second time period the transistor returns to its conductive state. The first time period allows the principal breaker to interrupt the fault current. When the principal breaker has successfully interrupted the fault current the charging signal has a magnitude of zero so that during the second time period, when the transistor is nonconductive, the capacitor does not charge and the control signal is not initiated. If however, the principal breaker fails to interrupt the fault current by the end of the first time period, the charging signal will have a magnitude greater than zero so that during the second time period, when the transistor is nonconductive, the capacitor is charged in response to the magnitude of the charging signal. If the capacitor fails to charge to the voltage level of the reference voltage during the second time period, the control signal is not initiated. If the capacitor charges to the voltage level of the reference voltage during the second time period the control signal is initiated. The overcurrent detector is thus responsive to the sum of the fault currents. This detector therefore provides a variably delayed control signal wherein the delay is appropriately lengthened when the fault condition does not threaten system stability, and is appropriately shortened when the fault condition does threaten system stability.

DESCRIPTION OF THE PREFERRED EMBODIMENT

Figure 1:
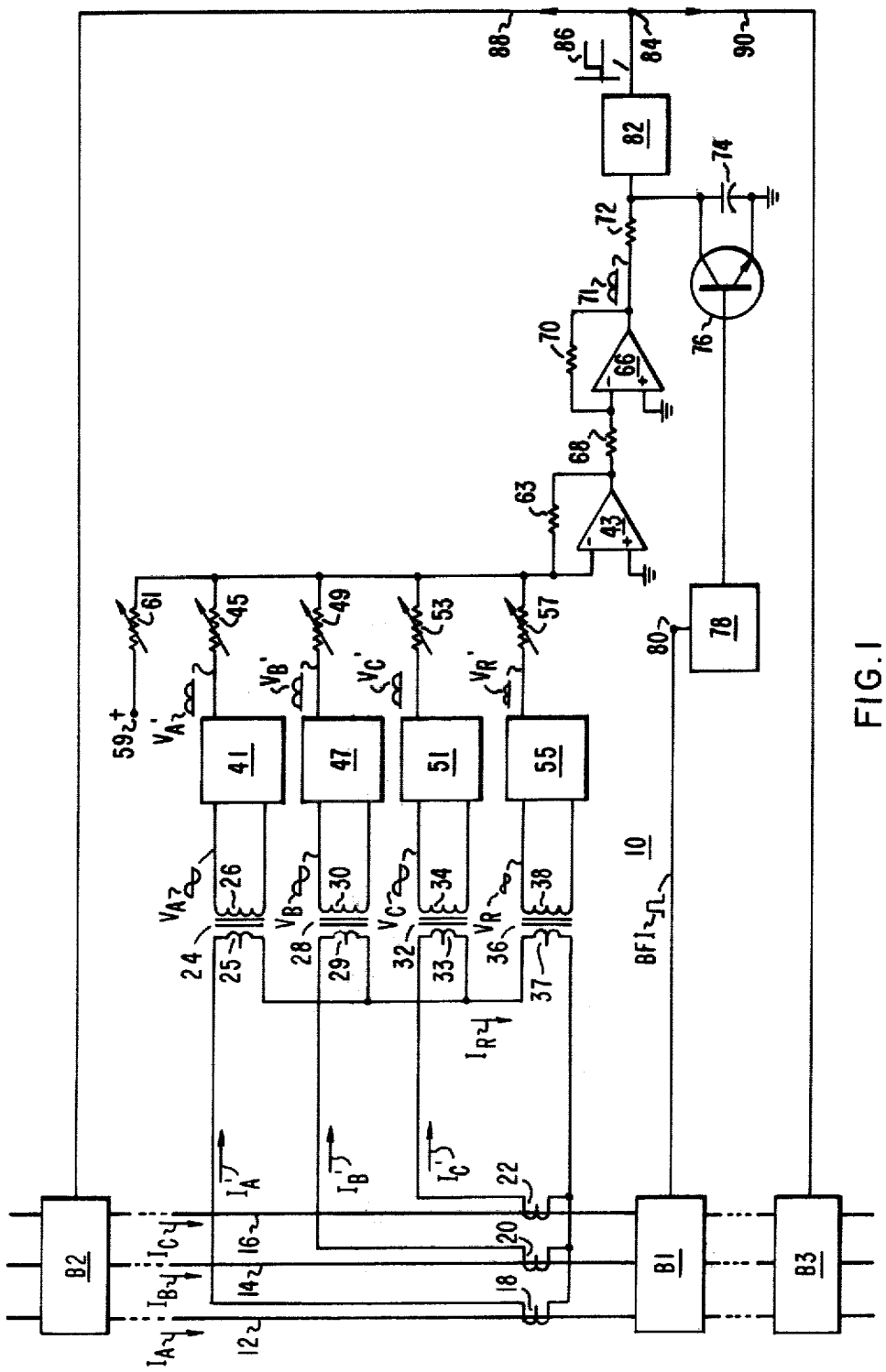
FIG. 1 is an electrical schematic illustrating a three-phase time overcurrent detector constructed in accordance with the present invention.

FIG. 1 is an electrical schematic illustrating the preferred embodiment of a three-phase time overcurrent detector 10 constructed in accordance with the present invention. A circuit breaker B1 represents a breaker at a local station to be monitored. Circuit breakers B2 and B3 represent backup breakers. A first electrical conductor 12 carries a first phase current $I_A$. A second electrical conductor 14 and a third electrical conductor 16 carry a second phase current $I_B$ and a third phase current $I_C$, respectively. A first current transformer 18 produces a signal $I_{A'}$ representative of the first phase current $I_A$. A first isolation transformer 24 has a primary winding 25 responsive to the signal $I_{A'}$ and a secondary winding 26 producing a first input signal $V_A$. The first input signal $V_A$ is representative of the first phase current $I_A$.

Similarly, a second current transformer 20 produces a signal $I_{B'}$ representative of the second phase current $I_B$. A second isolation transformer 28 has a primary winding 29 responsive to the signal $I_{B'}$ and a secondary winding 30 producing a second input signal $V_B$. The second input signal $V_B$ is representative of the second phase current $I_B$. a third current transformer 22 produces a signal $I_{C'}$ representative of the third phase current $I_C$. A third isolation transformer 32 has a primary winding 33 responsive to the signal $I_{C'}$ and a secondary winding 34 producing a third input signal $V_C$. The third input signal $V_C$ is representative of the third phase current $I_C$. A fourth isolation transformer 36 has a primary winding 37 responsive to the residual current $I_R$ which is the sum of the signals $I_{A'}$, $I_{B'}$ and $I_{C'}$. The fourth isolation transformer 36 has a secondary winding 38 producing a fourth input signal $V_R$. The fourth input signal $V_R$ is representative of the residual or ground current. The residual current is present during ground faults.

A first full-wave rectifier 41 produces, in response to the first input signal $V_A$, a full-wave rectified signal $V_{A'}$. The signal $V_{A'}$ is input to the inverting input terminal of an operational amplifier 43 through a variable resistor 45. Similarly, a second full-wave rectifier 47 produces, in response to the second input signal $V_B$, a full-wave rectified signal $V_{B'}$ that is input to the inverting input terminal of the operational amplifier 43 through a variable resistor 49. A third full-wave rectifier 51 produces, in response to the third input signal $V_C$, a full-wave rectified signal $V_{C'}$ that is input to the inverting input terminal of the operational amplifier 43 through a variable resistor 53. Lastly, a fourth full wave-rectifier 55 produces, in response to the fourth input signal $V_R$, a full-wave rectified signal $V_{R'}$ that is input to the inverting input terminal of the operational amplfier 43 through a variable resistor 57. A positive voltage is input at a terminal 59 to provide a bias signal. The bias signal is input to the inverting input terminal of the operational amplifier 43 through a variable resistor 61. The non-inverting input terminal of the operational amplifier 43 is connected to ground. A feedback resistor 63 is connected between the inverting input terminal and the output terminal of the operational amplifier 43.

The output terminal of the operational amplifier 43 is connected to the inverting input terminal of an operational amplifier 66 through a resistor 68. The non-inverting input terminal of the operational amplifier 66 is connected to ground. A feedback resistor 70 is connected between the inverting input terminal and the output terminal of the operational amplifier 66. A resultant or charging signal 71 is available at the output terminal of the operational amplifier 66. The charging signal is conducted to ground through the series combination of a resistor 72 and a capacitor 74. The junction point of the resistor 72 and the capacitor 74 is connected to ground through a transistor 76. the transistor 76 is responsive to a timing circuit 78. The timing circuit 78 is responsive to a breaker failure initiation BFI signal which is received at a terminal 80. The BFI signal may be provided by an appropriate breaker failure initiation circuit of the breaker B1 the instant a trip coil of the breaker B1 is energized. The junction point of the resistor 72 and the capacitor 74 is additionally connected to a level detector 82. The level detector 82 initiates a control signal 86 which is available at an output terminal 84. The terminal 84 is connected to a trip circuit of the breaker B2 by an appropriate communications link 88 and is connected to a trip circuit of the breaker B3 by an appropriate communcations link 90. This concludes the description of the hardware shown in FIG. 1.

In operation, the three-phase time overcurrent detector 10 shown in FIG. 1 produces four input signals $V_A$, $V_B$, $V_C$, and $V_R$ representative of the magnitude of the first phase current $I_A$, the second phase current $I_B$, the third phase current $I_C$, and the residual current $I_r$, respectively. The four input signals $V_A$, $V_B$, $V_C$ and $V_R$ are rectified by the rectifiers 41, 47, 51 and 55 producing the rectified signals $V_{A'}$, $V_{B'}$, $V_{C'}$ and $V_{R'}$, respectively. The four rectified signals $V_{A'}$, $V_{B'}$, $V_{C'}$ and $V_{R'}$ are scaled by the variable resistors 45, 49, 53 and 57, respectively. The scaled signals are added, together with the bias signal which is scaled by the variable resistor 61, by the operational amplifier 43. The operational amplifier 43 produces a voltage having a magnitude representative of the sum of the rectified signals and the bias signal. This voltage is inverted by the operational amplifier 66. The output voltage of the operational amplifier 66 is the charging signal 71. In normal operation the transistor 76 is conductive. Thus, the charging signal is conducted to ground through the series combination of the resistor 72 and the transistor 76.

Upon the occurrence of a fault condition the timing circuit 78 receives, at terminal 80, the BFI signal from the breaker failure initiation circuitry of the breaker B1. In response to the BFI signal the timing circuit 78 times out a first, fixed and predetermined time period during which the transistor 76 continues to be conductive. At the end of the first time period the timer begins to time out a second, fixed and predetermined time period during which the transistor 76 is nonconductive. At the end of the second time period the transistor 76 returns to its conductive state. The timing circuit therefore provides a window during which the charging signal, if present, must charge the capacitor 74. If the fault current is interrupted by the principal breaker B1 during the first time period, the charging signal 71 has a magnitude of zero. During the second time period the transistor is nonconductive and the charging signal is conducted to ground by the series combination of the resistor 72 and the capacitor 74. However, the capacitor 74 does not accumulate any charge since the charging signal 71 has a magnitude of zero. If the fault current is not interrupted by the end of the first predetermined time period the charging signal 71 will have a magnitude greater than zero. During the second time period the transistor 76 is nonconductive and the capacitor 74 accumulates charge in response to the magnitude of the charging signal. The level detector 82 continually monitors the voltage level of the capacitor 74. If the voltage level of the capacitor 74 equals a predetermined reference voltage level before the end of the second time period, the level detector 82 initiates the control signal 86 which is available at the output terminal 84. If the capacitor fails to charge to the voltage level of the reference voltage before the end of the second time period, the control signal 86 is not initiated.

The control signal 86 may be used to initiate appropriate breaker backup relaying, such as by using the control signal 86 to initiate trip signals for the circuit breakers B2 and B3 located on either side of the failed breaker B1. The greater the magnitude of the charging signal, the faster the capacitor 74 charges to the predetermined voltage level. The operating characteristics of the three-phase time overcurrent detector 10 shown in FIG. 1 are discussed in detail hereinafter.

Figure 2:
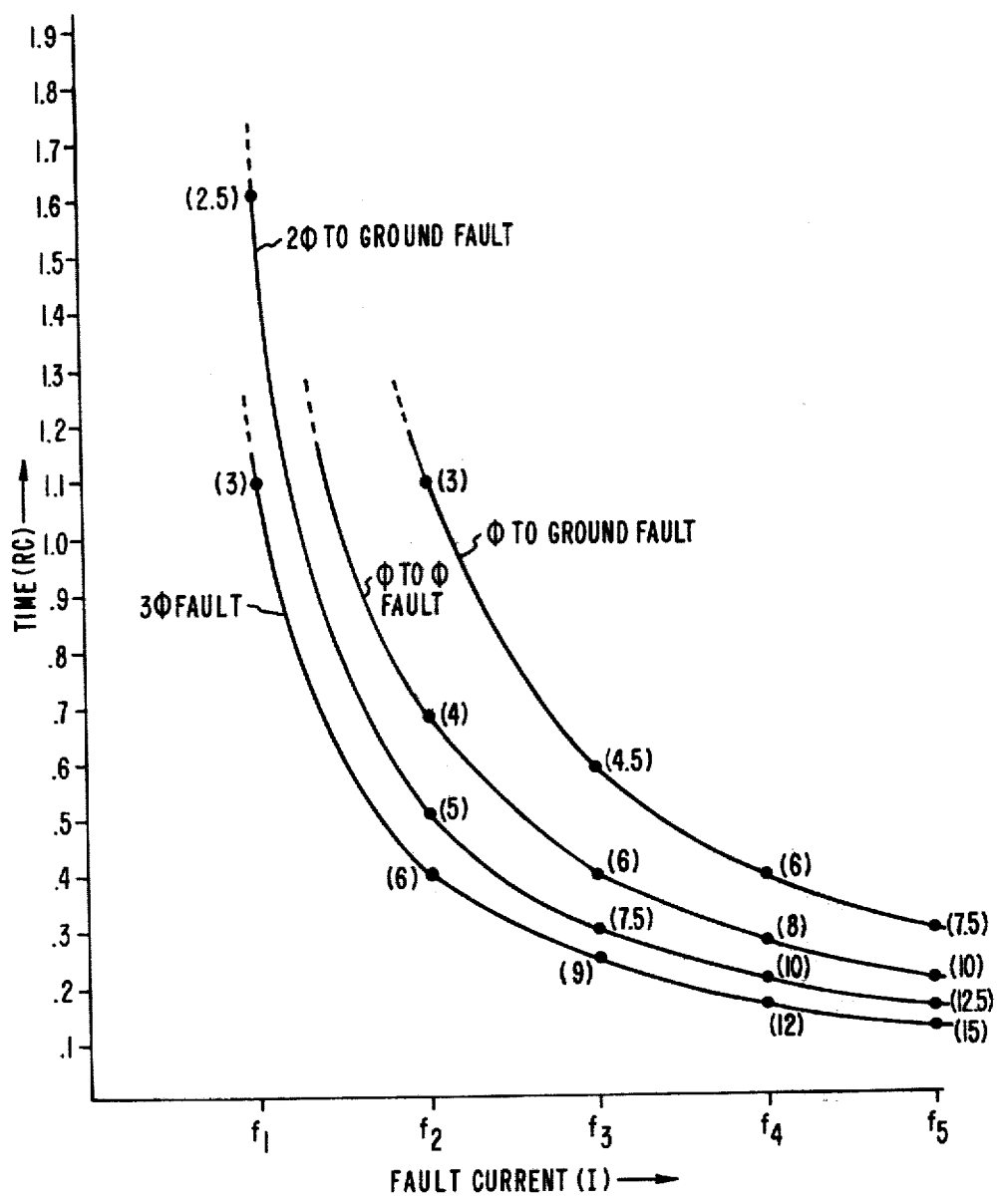
FIG. 2 is a graph illustrating the operating characteristics of the present invention for various fault conditions.

FIG. 2 is a graph illustrating the operating characteristics of the three-phase time overcurrent detector shown in FIG. 1. The graph is obtained from the equation:

$$V(t) = V(1 - e^{-t/RC}) \quad (1)$$

where:
 V(t) = voltage level of the capacitor 74
 V = magnitude of the charging signal
 t = time
 R = value of the resistor 72; and
 C = value of the capacitor 74

Setting V(t) equal to the predetermined voltage level, equation (1) may be solved for t which represents the time period from the time the transistor 76 becomes nonconductive until the time the capacitor 74 charges to the predetermined reference voltage level. Assuming the predetermined voltage level is two volts, and that a fault current $I_{f2}$ is flowing in phase A and ground such that the magnitude of the rectified signal $V_A'$ is two volts and the magnitude of the rectified signal $V_R'$ is one volt, then the magnitude, V, of the charging signal is three volts and equation (1) becomes:

$$2 = 3(1 - e^{-t/RC}) \text{ or}$$

$$t = 1.099RC \quad (2)$$

If the same fault current $I_{f2}$ is flowing in two phases the magnitude of charging signal is twice the magnitude representative of $I_{f2}$ flowing in one phase, or four volts. Equation (1) then becomes:

$$2 = 4(1 - e^{-t/RC}) \text{ or}$$

$$t = 0.693RC \quad (3)$$

If the same fault current $I_{f2}$ is flowing in two phases and ground, then the magnitude of the charging signal is five volts and equation (1) becomes:

$$2 = 5(1 - e^{-t/RC}) \text{ or}$$

$$t = 0.511RC \quad (4)$$

Finally, if the same fault current $I_{f2}$ is flowing in all three phases, then the magnitude of the charging signal is six volts and equation (1) becomes:

$$2 = 6(1 - e^{-t/RC}) \text{ or}$$

$$t = 0.405RC \quad (5)$$

Equations (2) through (5) illustrate the time it takes the capacitor 74 to charge to the predetermined voltage level of two volts given that the fault current $I_{f2}$ is flowing in one phase and ground, two phases, two phases and ground, and three phases, respectively. The time is expressed in terms of RC which is called the time constant.

Equation (1) may similarly be solved assuming a fault current $I_{f1}$ flows in one phase and ground and is represented by a charging signal having a magnitude of one and one-half volts, flows in two phases producing a charging signal having a magnitude of two volts, flows in two phases and ground producing a charging signal having a magnitude of two and one-half volts, and flows in three phases producing a charging signal having a magnitude of three volts. The times required for the capacitor to charge to the reference voltage level of two volts are summarized in the first row of chart A. The second row of chart A summarizes the above analysis for the fault current $I_{f2}$. The third, fourth, and fifth rows of chart A summarize the analysis of equation 1 assuming fault currents of $I_{f3}$, $I_{f4}$ and $I_{f5}$. The numbers in parentheses indicate the magnitude of the charging signal. For example, a fault current of $I_{f3}$ flowing in three phases will produce a charging signal having a magnitude of nine volts.

| CHART A Solutions of Equation (1) for Time in Fractions of RC | | | | |
|---|---|---|---|---|
| Fault Current | 1φ to Gnd Fault | φ to φ Fault | 2φ to Gnd Fault | 3φ Fault |
| $I_{f1}$ | (1½) | ∞ (2) | 1.609 (2½) | 1.099 (3) |
| $I_{f2}$ | 1.099 (3) | .693 (4) | .511 (5) | .405 (6) |
| $I_{f3}$ | .588 (4½) | .405 (6) | .310 (7½) | .251 (9) |
| $I_{f4}$ | .405 (6) | .288 (8) | .223 (10) | .182 (12) |
| $I_{f5}$ | .310 (7½) | .223 (10) | .174 (12½) | .143 (15) |

As illustrated by FIG. 2 the time required for the capacitor 74 to charge to the two volt level (the voltage level the capacitor must reach before the level detector 82 will initiate the control signal 86) is inversely related to both the magnitude of the fault current and the number of faulted phases. For example, the time delay for a fault current of $I_{f4}$ flowing on one phase and ground is equal to the time delay for a fault current of $I_{f2}$ flowing in all three phases. In this manner small fault currents flowing in several phases will result in the initiation of the control signal as quickly as a large fault current flowing in one phase. Thus, the three-phase time overcurrent detector 10 in FIG. 1 provides additional protection for the situation where small fault currents are flowing in multiple phases thus threatening system stability without producing undesirable tripping of the backup breakers when the same small fault current is flowing in one phase and ground.

If there is no fault current i.e., if the principal breaker has successfully interrupted the fault current, or if the sum of the currents results in a charging signal having a magnitude that is insufficient to charge the capacitor 74 to the two volt reference level within the window provided by ythe timing circuit 78, the level detector 82 will not initiate the control signal 86. The minimum total of the fault currents for which the capacitor 74 can ajust charge to the referencae voltage level of the level deteactor 82 within the time window provied by the timing circuit 78 is defined as the current sensitivity, or pickup. For example assume a time window of 1.1 RC is provided by the timing circuit 78 and that the reference voltage that the level detector 82 responds to is two volts. From FIG. 2 is tcan be seen that if thea charging signal 71 has a magnitude of three volts it will take 1.1 RC for the capacitor 74 to charge to the reference level of two volts which is exactly the duration of the time window provided by the timing circuit 78. A charging signal less than three volts will not charge the capacitor 74 within the time window. A charging signal greater than three volts wilal charge the capacitor 74 in less time than the 1.1 RC time window. Thus, in this example, the current sensitivity, or pickup, is any combination of input signals whose weighted sum produces a charging signal having a magnitude of three volts.

The times shwon in FIG. 2 are ractional values of the time constant RC. Thus, the desired time delay from the time the capacitor 76 becomes non-conductive until the capacitor 74 charges to the two volt level may be obained by choosing appropriate values for R, the resistor 72, and C, the capacitor 74. Even after the values for R and C have been chosen the time delayed may be decreased by lowering the voltage level of the reference voltage or increasing the magnitude, V, of the charging signal The magnitude of the charging signal may be increased by appropriate scaling of the four signal $V_1'$, $V_B'$, $V_C'$. In this case, the appropriate scaling of the four signals is accomplished by decreasing the resistanc values of the four variable resistors 45, 49, 53, and 57, respectively. Cnversely, the time delay may be increased by increasing the voltage level of the reference voltage or decreasing the magnitude, V, of the charging signal The magnitude of the charging signal may be decreased by increasing the resistance values of the four variable resistors 45, 49, 53, and 57.

In addition to increasing or decreasing the magnitude, V, of the charging signal by decreasing or increasing, espeactively, the resistance values of the variable resistors 45, 49, 53 and 57, the variation of these resistance values may also be used to scale the four signals $V_1'$, $V_B'$, $V_C'$ and $V_R'$ such that the relative weights of each of the signal is established. For example, a determination that the contribution to the magnitude of the charging signal by the rectified signal $V_R'$ should be half as great as the contributions of the other rectified signals $V_A'$, $B_B'$ and $V_C'$, may be implemented by setting the resistance value of the variable resistor 57 to twice the value of each of the variable resistors 45, 49, and 53 respeactively.

The operating characteristics shown in FIG. 2 may additionally be modified by the introduction of the bias signal. The variable resistor 61 determines the relative weight of the bias signal. When used, the effect of the bias signal is to decrese the time required for the capacitor 74 to charge to the reference voltage level. Thus, the effect of the its signal is to moe the four curves shown in FIG. 2 downward. Since the four curves shown in FIG. 2 are exponential functions, the bias signal will have its greatest effect on the curve representing single phase to ground faults. The overall effect of the bias signal will be a downward movement of the four curves shown in FIG. 2 with the uppermost curves moving the greatest distance.

The preferred embodiment discussed herein is intended as an illustration and not a limitation. It is anticipated that the present invention may be practiced without the bias signal provided by the positive voltage source and without the fourth input signal $V_R$ provided by the fourth isolation transfomer 36. It is also anticipated that alternate methods of producing the necessary input signals, and asdding those input signals together, may be practiced which still fall within the scope of the present invention.

In summary, the present invention is for a protective relaying apparatus producing a variably delayed control signal in response to a fault condition on a three-phase electrical system. Isolation transformers produce input signals representative of thea curren flowing in each phase, and produce an input signal representative of the residual current. The input signals are rectified, scaled, and added, together with a bias signal, to produce a chargingg signal. In normal operation the charging signal is conductead to ground through the series combinatin of a resistor and a transistor. In the event of a fault condition, a timing circuit times out a first, fixed and predetermined time period during which the transistor remains conductive, followed by a second, fixed and predetermined time period during which the transistor is nononductive. When a the transistor is nonconductive the charging signal is conducted to ground by the series combination of the resistor and a capacitor. urging the second time period the charging signal, if any, must charge the capacitor to a reference voltage level. A level deteactor continually monitors the voltae levael of the capacitor. If the voltage level of the capacitor equals the voltage level of the reference voltage within the second time period, the control signal is initiated.

The total time period from the occurrence of the fault condition until the initiation of the control signal is equal to the sum of the first predetermined time period timed out by the timing circuit and the time period required for the capacitor to charge to the predetermined reference voltage. The time period required for the capacitor to charge to the reference voltage level is inversely related to the magnitude of the fault currents and the number of faulted phases. Relating the time period required for the capacitor to charge to the reference voltage level to the number of faulted phases results in backup tripping times which are more consistent with system stability requirements than if only fault current magnitude is considered. The net result is the optimization of the design tradeoff betweeen the desire to rapidly clear faults that threaten system stability and the desire to avoid unnecessary backup tripping for less critical single phase-to-ground faults that do not seriously threaten system stability.

What is claimed is:
1. A protective relaying apparatus producing a variably delayed control signal in response to a fault condition on a polyphase electrical power system, and wherein said delay is inversely related to the severity of said fault condition, comprising:
  input means for producing, for each of said phases of said polyphase system, an input signal representative of the current flowing in said phase;
  means for scaling each of said input signals
  circuit means for adding said scaled input signals so as to produce a resultant signal representative of the sum of said currents in each of said phases, said circuit means including an operational amplifier responsive to said scaled input signals and an inveter aresponsive to said operational amplifier;
  accumulating means for receiving said resultant signal at the end of a predetermined time period mea- sured from the occurrence of said fault condition, said accumulating means producing an accumulated value; and means for comparing said accumulated value to a predetermined value, and for producing said control signal such that said variable delay is equal to the sum of said predetermined time period and the time period required for said accumulated value to become equal to said predetermined value.

2. The relaying apparatus of claim 1 wherein the polyphase electrical power system includes a three-phase system.

3. The relaying apparatus of claim 1 wherein the accumulating means includes a capacitor.

4. The relaying apparatus of claim 2 wherein the input means includes four current transformers, three of said transformers each producing an input signal responsive to the current in one of the three phases, said fourth transformer producing an input signal responsive to the residual current.

5. The relaying apparatus of claim 4 wherein the input means includes four rectifiers each producing a rectified signal in response to one of the input signals.

6. The relaying apparatus of claim 4 wherein the means for scaling the input signals including four adjustable resistors.

7. The relaying apparatus of claim 1 including a feedback resistor, and wherein the operational amplifier has an input and an output terminal, and wherein the inverter has an input and an output terminal, and wherein said operational amplifier receives the scaled input signals at said input terminal thereof, and wherein said feedback resistor is connected between said input terminal and said output terminal of said operational amplifier, and wherein said output terminal of said operational amplifier is connected to said input terminal of inverter, and wherein the resultant signal is produced at said output terminal of said inverter.

8. The relaying apparatus o claim 7 including a biasing means producing an adjustable bias signal input to the input terminal of the operational amplifier.

9. The relaying apparatus of claim 3 including timing means providing the predetermined time period in response to the occurrence of the fault condition and providing a second predetermined time period after the first time period, and including switching means selectively connecting the resultant signal to the capacitor in response to said second time period.

10. A protective relaying apparatus producing a variably delayed control signal in response to a fault condition on a three-phase electrical power system, and wherein said delay is inversely related to the severity of said fault condition, comprising: input means for producing, for each of said phases of said three phase system, a input signal reprsentative of the curent flowing in said phase, and for producing an input signal representative of the residual current; means for producing an adjustable bias signal; means for scaling each of said input signals; circuit means for adding said scaled input signals and said bias signal so as to produce a resultant signal having a magnitude representative of the sum of the magnitudes of said phase currents, said residual current, and said bias signal, said circuit means including an operational amplifier responsive to said aforementioned signals and an inverter responsive to said operational amplifier; timing means for timing out a predetermined time period from the occurrence of said fault condition and a second predetermined time period after about first time period; a capacitor; switching means for selectively connecting said circuit means for adding to said capacitor in response to said second time period, said capacitor charging to a predetermined voltage level at a rate responsive to the magnitude of said resultant signal; and level detecting means for comparing said voltage level, and for producing said control signal such that said variable delay is equal to the sum of said predetermined time period and the time period required for said capacitor to charge to said predetermined voltage level.

* * * * *